United States Patent [19]

Maddalena

[11] 3,767,503

[45] Oct. 23, 1973

[54] SEALING METHOD
[75] Inventor: John Maddalena, Ringoes, N.J.
[73] Assignee: Cities Service Company, New York, N.Y.
[22] Filed: July 23, 1971
[21] Appl. No.: 165,582

Related U.S. Application Data
[63] Continuation-in-part of Ser. No. 94,810, Dec. 3, 1970.

[52] U.S. Cl................ 156/244, 156/295, 260/33.6, 404/66, 404/74
[51] Int. Cl............................................. B29d 23/04
[58] Field of Search............................ 156/244, 295

[56] References Cited
UNITED STATES PATENTS

| | | | |
|---|---|---|---|
| 3,444,023 | 5/1969 | Shockey | 156/295 |
| 3,490,978 | 1/1970 | Shockey et al. | 156/295 |
| 3,542,619 | 11/1970 | McManus | 156/295 |
| 3,468,738 | 9/1969 | Deisenroth | 156/295 |
| 3,155,204 | 11/1964 | Campbell et al. | 156/295 |
| 3,241,277 | 3/1966 | Coppock | 156/295 |
| 3,340,224 | 9/1967 | Sherman et al. | 156/304 |

Primary Examiner—George F. Lesmes
Assistant Examiner—M. E. McCamish
Attorney—J. Richard Geaman

[57] ABSTRACT

Elastomeric sealant compositions are heated and extruded as a tape. The extruded tape is applied hot to a structural joint to be sealed. Application is thus much easier than with a cold tape and bonding to substrates is greatly enhanced. Furthermore, tape which would otherwise be too stiff can be installed in this manner while providing outstanding yield strength and resistance to creep. In preferred embodiments of the invention, the tape is extruded continuously and is simultaneously applied to one or more surfaces being joined. The invention can be used to advantage in the installation of automobile windshields and in the sealing of joints in architectural structures or roadways.

14 Claims, No Drawings

SEALING METHOD

BACKGROUND OF THE INVENTION

This application is a continuation-in-part of U. S. Pat. application Ser. No. 94,810 filed Dec. 3, 1970, and assigned to the same assignee as this application.

The present invention pertains to elastomeric sealants and more particularly to methods of producing and applying elastomeric sealants in the form of a sealant tape.

The term "elastomeric sealants" or "sealant composition" as used herein refers to pliant, weather sealing compounds wherein rubber is the base, and which have a solid yet plastic or putty-like consistency so that the sealant can be pressed into the crevice of a joint but will maintain its shape and position after application. Various types of rubbers are employed in the formulation of such sealants e.g. butyl, EPDM, polyisobutylene, polysulfide, polyurethane, silicone, thermoplastic acrylic, and compatible blends thereof. At the time of applying the sealant to a joint, the rubber in the sealant should be unvulcanized or only partially vulcanized to provide the necessary plasticity. Plasticity can also be controlled by inclusion of a thermoplastic resin such as polyethylene and/or ethylene vinyl acetate and also by means of rubber plasticizers and extender oils, tackifiers, and also the commonly employed inert and/or reinforcing fillers such as carbon black, silica, talc, calcium silicate, calcium carbonate, diatomaceous earth, mica, clays, and mixtures thereof.

The term "tape" as used herein is intended to mean an elongated strip of elastomeric sealant having a length, width, thickness and shape suitable for convenient application to a joint to be sealed. The specific dimensions and configuration which are given to a tape are therefore dictated by the size and shape of the structural joint for which it is intended. The tape should be large enough to fit tightly into the joint, but should not be so large as to protrude excessively or complicate the installation thereof.

The use of sealant tapes in the weather sealing of structural joints is well known. Tapes are used to advantage in the sealing of automobile windshields and back lights with the body of the car, in the sealing of building windows, and also in the sealing of masonry joints in roadways, buildings, swimming pools, sidewalks, patios, plaza decks, reservoirs and the like. Where the crevice of a joint is relatively wide or bottomless, the use of sealant tape is preferred to liquid sealants which are applied in liquid form, and even more so when the joint extends vertically or is overhead since it is normally difficult to apply and retain a liquid in place in such cases. Nonetheless, certain difficulties have been experienced with sealant tapes when they are used in applications for which they are primarily intended. These difficulties have been brought on by mental hang-ups associated with the knowledge that tapes have heretofore been at ambient temperature when installed, and in which case they should have the flow and wetting properties available from a liquid, for the purpose of filling and adherence, while also having the properties of a solid so that they can be easily handled and installed. The formulator has thus had to walk the tight rope between stiffness and flow, i.e., the tape must be plastic enough for easy application accompanied by good adherence to the surfaces of the joint, yet stiff enough to remain in place once applied. More often than not, such a convenient compromise could not be arrived at, i.e., the tape was either too stiff to install or else was inclined to creep excessively after having been installed.

SUMMARY OF THE INVENTION

It is therefore an object of this invention to provide a method for applying sealant tapes whereby previous difficulties with installation and subsequent creep of the sealant is avoided.

Another object is to provide a method for applying a sealant tape which is normally too stiff for installation at room temperature, but which can nonetheless be installed at ambient conditions to obtain an excellent bond with substrates of a joint.

Still another object of the present invention is to provide a method for continuously extruding and simultaneously applying a sealant tape to a structural joint while the tape is heated.

A paramount object of this invention is to provide a superior method of sealing a structural joint by means of a sealant tape.

Other objects and advantages of the invention will become apparent from the following description and the appended claims.

In accordance with the present invention, an elastomeric sealant tape composition can first be compounded in a conventional manner, i.e., by means of a Banbury mixer, roll-mill, sigma-blade mixer, etc., using a preferred rubber as the base and including skillfully selected amounts of suitable additives such as fillers, plasticizer or extender oils, tackifiers, processing aids, and the like. Where preferred, the rubber can be partially cross-linked prior to compounding or application of the sealant. After compounding, the sealant composition is then passed through a heated extruder, which preferably is portable or else mechanically movable automatically as in an assembly line set-up for installing automobile windshields. One type of extruder which can be employed is described in copending application Ser. No. 94,810, filed Dec. 3, 1970, this application being a continuation-in-part thereof. By means of the extruder, the sealant composition is simultaneously heated and extruded as a tape. While still heated, the extruded tape is applied to a joint to be sealed and is then allowed to cool after a seal has been established. Properly selected and installed in accordance with invention, the sealant is characterized by good resistance to creep and by excellent bonding with the substrates to which it is applied.

It will be appreciated that the extruder can be selectively fitted with an orifice which provides a tape having a size and shape adapted to the particular structural joint being sealed, and that by moving the extruder while maintaining the orifice aligned with the joint, a tape can be extruded and simultaneously applied.

Where preferred, the sealant composition which is heated, extruded and applied to a joint can be compounded to have a room temperature stiffness in excess of that of prior compounds produced in attempts to optimize ease of application, good bonding strength and resistance to creep when the tape is installed at normal ambient temperatures. However, the present invention permits compounding of compositions which would be impractically stiff for application and bonding with the substrates at ambient temperatures, but which become more plastic and adhesive when heated, and yet maintain a strong sealing relationship and are highly resistant to creep not only after they have cooled down but also during the hot application as well.

DESCRIPTION OF THE PREFERRED EMBODIMENTS

The present invention is not limited to use of any particular type of rubber as the elastomeric base for the sealant composition, the selection of such being the option of one skilled in the art, but rubbers having outstanding resistance to weathering and aging are generally preferred. For instance, butyl, EPDM, polyurethane, polysulfide, polyisobutylene, thermoplastic acrylic and silicone rubbers can be employed, and also mixtures thereof, but the use of butyl rubber is preferred since it is more impermeable than most rubbers and is especially resistant to age and weathering.

The ultimate stiffness of the sealant can be controlled by well known techniques, e.g. by regulating the amount of filler and/or plasticizer incorporated into the composition. As is also well known, stiffness can generally be increased by raising the amount of filler employed, and also by reducing the amount of plasticizer or extender oil, and vice versa in order to reduce stiffness. Other methods of increasing stiffness involve inclusion of resins which are solid at normal ambient conditions but which are melted during mixing of the composition, e.g. polyethylene, ethylene-vinyl acetate resins, coumerone-indene resins, hydrocarbon resins, pimene resins, and hydrogenated resin esters. Greater stiffness can also be imparted by partial cross-linking or semivulcanization of the rubber by reaction with an amount of vulcanizing agent which is less than that required for a full cure of the compound. One method of partially vulcanizing butyl rubber for sealant tape applications is described in U. S. Pat. No. 3,674,735 which issued July 4, 1972, and is assigned to the same assignee as this application.

The type and proportion of rubber and other ingredients which can be employed in formulating sealant compositions suitable for application and sealing by the present method are thus subject to considerable variation, but suitable compositions will be almost immediately apparent to those skilled in the art, or else can be readily arrived at by only a few simple experiments. For the sake of convenience, and without intending limitation, the invention will be further described with reference to butyl rubber as the elastomeric base for the sealant tape compositions since, as was previously indicated, butyl rubber is especially suited to such application because of its excellent resistance to aging and weathering. While many different formulations are usable, those which are preferred will contain 100 parts by weight of butyl rubber, or a partially vulcanized butyl rubber composition, about 70 to about 150 parts by weight of carbon black, and about 50 to about 130 parts by weight of rubber plasticizer. Optionally the composition can contain a tackifying agent, preferably in amounts of about 10 to about 60 parts by weight. Fine, high structure furnace blacks, and particularly HAF-HS black, are preferred and can be employed in amounts of about 80 to about 150 parts by weight. Noncarbon fillers can be employed in place of or along with carbon black filler. Nonreinforcing, noncarbon fillers such as calcium carbonate can be employed in amounts up to 500 parts by weight along with up to 250 parts by weight of plasticizer. When reinforcing, noncarbon fillers such as silica are employed, it may be necessary to employ an amount which is less than that indicated for carbon black, and more plasticizer may also be needed. Polybutenes and napthenic or paraffinic rubber processing oils are preferred plasticizers and extenders and preferred amounts thereof are about 70 to about 150 parts by weight. Either one or the other can be employed, but combinations of both are preferred for certain applications. Mixing of the ingredients of the sealant composition prior to extrusion should be carried out, of course, under conditions of temperature and shear which assure thorough blending without excessive thermal or mechanical degradation of the stock.

As previously indicated, a stiffness in the sealant composition is sought whereby creep under exposure to normal conditions of use is avoided, but wherein softening occures at higher temperatures so that installation of the tape in the joint is accomplished with relative ease. One method of measuring the stiffness of a tape is by means of a compression test whereby the amount of force required to compress a tape specimen having a standard size to a given thickness is determined. Hereinafter, reference to "Compression Value" will be with respect to determinations made in accordance with the following procedure:

COMPRESSION VALUE:

Two specimens of sealant tape 3 inches long and three-eights inch square are placed parallel to each other one inch apart between two glass plates having dimensions of 3 inches by 3 inches by ¼ inch. This assembly is compressed in an Instron Tester at a speed of two inches per minute until the distance between the plates is 0.200 inches. The pounds of pressure required to achieve this degree of compression is then converted to pounds per cubic inch based on the total volume of the tape specimens. Unless otherwise indicated, testing is carried out at 75° F. Repeatable accuracy of the test is about ± 10 percent.

In the past, sealant tapes have been characterized by a Compression Value at 75° F within the range of about 50 to about 200 p.c.i. and more typically within the range of about 80 to about 120 p.c.i. The tape is difficult to install if it is too stiff and is inclined to creep excessively during service if it is insufficiently stiff. Tapes having a Compression Value in excess of 200 p.c.i. at 75° F are virtually impossible to install at room temperature and are inclined to creep extremely if the Compression Value is below 50 p.c.i. Therefore, sealant compositions are compounded so that when heated and extruded in accordance with the present invention the Compression Value of the resulting heated tape at the time of sealing a joint therewith is substantially less than 200 p.c.i., advantageously within the range of about 80 p.c.i. to about 120 p.c.i., and most preferably within the range of about 75 p.c.i. to about 105 p.c.i. Accordingly, sealant tapes produced and applied in accordance with the present method can have a Compression Value at 75° F within the range of about 150 p.c.i. to about 500 p.c.i., although sealants having lower and higher Compression Values at 75° F can also be employed. Furthermore, sealants having a Compression Value considerably in excess of 200 p.c.i. at 75° F can be easily installed while also providing excellent resistance to yield and creep.

The extent to which the sealant composition is heated prior to or during extrusion as a tape is subject to variation depending upon the room temperature stiffness thereof and the stiffness desired at the time of sealing the joint. It will be understood that the heating temperature should not be so high as to bring on excessive volatilization of ingredients such as process oils or objectionable thermal or oxidative degradation of the compound, but should nonetheless effect a substantial lowering of the Compression Value when compared to the Compression Value as measured at 75° E in order to facilitate application of the tape and adherence of the sealant composition with the substrates of the joint. Therefore, extrusion temperatures within the range of about 120° F to about 400° F are generally satisfactory. It has been observed, for instance, that when a sealant tape composition having a Compression Value of about 300 p.c.i. at 75° F is extruded as a sealant tape at 250° F, it can nonetheless have a Compression Value of only about 100 p.c.i. within 4–5 minutes after application to a substrate having an ambient temperature of 75° F. It will thus be apparent that ample time can be afforded for installing the tape in the crevices of the joint, even when the tape is first applied to the joint edge of one structural member followed, by pressing the joint edge of another structural member against the heated tape in order to establish a seal. It will also be apparent that the temperature at which the tape can be extruded to best advantage will depend upon its stiffness at room temperature, the degree of plasticity needed for easily obtaining the seal and, hence, the amount of time lag which is likely to occur between application of the tape and actually effecting the seal. The tape can, therefore, be applied in a somewhat excessively plastic state, followed by establishment of the seal prior to excessive cooling of the sealant.

As previously indicated, the extruder described in the parent application of this application can be employed for extruding and applying heated sealant tapes in accordance with the present methods. It will be understood, however, that other types of extruders can be employed for the purpose, e.g. one in which the sealant is fed to the extruder barrel in a form other than a strip or rope, or wherein means other than a screw is used to expel the sealant out of the barrel through the tape-forming orifice. Furthermore, the sealant can be heated prior to being fed into the extruder; and, as previously indicated, the extruder or a tape extrusion orifice thereof can be arranged to automatically move and apply tape to a joint to be sealed. On the otherhand, the extruder can be mounted with extruded tape being applied to a joint edge which moves past the extruder orifice, or tape strips can be cut, removed and applied to joints before the tape cools down.

The term "application" or variants thereof as used herein with reference to sealant tape encompass "installation" of sealant in the crevices of a joint. In some cases the heated tape is installed by application to the edge of a first structural member, followed by firmly pressing the joining edge of a second structural member against the heated tape which has already been applied to the edge of the first member, thus establishing a sealing relation between the adjacent edges of the two members through adhesive contact with the tape. If the edges of the structure forming the joint are already adjacent, the tape is applied over both edges and forced into the crevices of the joint by pressure from the extruder.

The invention will now be further described by reference to specific examples which are illustrative, and it will be understood that other accordant embodiments will become apparent to one of ordinary skill in the art.

EXAMPLE I.

A masterbatch was produced having the following recipe:

| | Parts by Weight |
|---|---|
| Bucar 5000 NS (a) | 100 |
| Tufflo 6056 (b) | 30 |
| Celite HSC (c) | 30 |
| SP-1055 (d) | 1 |

(a) Butyl Rubber, ML-3260°F. of 55; Cities Service Co.
(b) Paraffinic rubber process oil; Sinclair Refining Co.
(c) Diatomaceous earth; Johns-Mansville Products.
(d) Bromomethyl, alkylated, phenol-formaldehyde resin; Schenectady Chemicals, Inc.

In producing the masterbatch, the resin was first thoroughly mixed with the diatomaceous earth, and all of the ingredients were than blended in a Banbury. The masterbatch was also heated to effect cross-linking and partial cure of the rubber by means of the resin. The Mooney viscosity (ML-3'260° F.) of the resulting masterbatch was 55.

The masterbatch described above was then formulated with other ingredients by means of Banbury mixing to provide sealant compositions in accordance with the following formulations:

RECIPE

| | Parts by weight | | | | | |
|---|---|---|---|---|---|---|
| | 1 | 2 | 3 | 4 | 5 | 6 |
| Masterbatch... | 100 | 100 | 100 | 100 | 100 | 100 |
| Statex RH e... | 90 | 90 | 90 | 90 | 90 | 90 |
| Indapol 100H f........ | 55 | 20 | 70 | 55 | 35 | 35 |
| Sunpar 2100 g........ | 30 | 15 | 10 | 15 | 30 | 15 |
| ST-5115 h............. | | | 10 | 10 | 20 | 20 | e HAF-HS carbon black, Cities Service Co.
f Polybutene processing aid, Amoco Chemical Corp.
g Paraffinic rubber process oil, Sun Oil Co.
h Polyterpene tackifying resin, Schenectady Chemicals, Inc.

e HAF-HS carbon black, Cities Service Co.
f Polybutene processing aid, Amoco Chemical Corp.
g Paraffinic rubber process oil, Sun Oil Co.
h Polyterpene tackifying resin, Schenectady Chemicals, Inc.

Compression Values, Shore "A" hardness, yield strength, and heat flow (creep) resistance of each of the compositions were then determined and are shown in Table 1.

The test for determining Compression Values has already been described. Heat flow and yield values were determined as follows:

HEAT FLOW:

An assembly used in the compression test is made up and is compressed to a thickness of 0.200 inches and is held there for one minute. Compression is released, and the assembly is then subjected to the compression of a one and 1/2 pound weight at 75° F. After 1 hour the distance between the plates is measured. With the weight still in place, the assembly is heated at 190° F. for 24 hours and the distance between the plates is measured after the assembly has cooled to 75° F. The procedure is then repeated at an exposure to 190° F. for 2 weeks. With any of the three tests, the measured distance between the plates should not be less than 0.200 inch, the original compressed thickness. Values in excess of 0.200 inch indicate rebound of the specimen from original compression and should not exceed 0.250 inch. In such cases, relative heat flow, or creep, of specimens can be compared on the basis of reduction in specimen height over the two week exposure to 190° F.

YIELD TEST:

An assembly of tape and glass plates is made up and compressed as in the compression test. The glass plates are pulled apart by means of the Instron Tester at the rate of 1 inch per minute (75° F.) to failure of either the cohesive or adhesive bond of the sealant with the glass. Pounds of pull required to effect the separation is converted to pounds per square inch based upon the original average cross-sectional area of the tape specimens. A test value of 7.5 p.s.i. or higher is preferable.

Composition 1 of Table 1 was produced for use as a tape in the sealing of automobile windshields with the body structure, and for a case in which the tape is not heated prior to installation and is therefore applied at room temperature. As can be seen, Composition 1 had a Compression Value of 106 p.c.i. at 75° F. thus making it readily suitable for easy application during sealing. This composition was also characterized by yield and heat flow values well within the acceptable limits.

also noticeably better. It will thus be apparent that Composition 2 can be heated, extruded and successfully applied in accordance with the present methods to provide a high strength seal with good resistance to creep.

In Compositions 3–6, the stiffness of the sealant was progressively increased by reducing the total amount of process oil and polybutene, and by use of a polyterpene tackifying resin which solidifies at room temperature. These four compositions had Compression Values at 75° F. within the range of 125–250 p.c.i., which is in excess of the most preferred range of about 75–105 p.c.i. for room temperature sealing, and Compositions 4–6 had Compression Values at 75° F. which bordered upon or exceeded 200 p.c.i., previously regarded to be the upper practical limit. Compositions 3 had performance characteristics about equivalent to Composition 1, but it can also be seen that the stiffer Compositions 4–6 were reduced to a preferred Compression Value when heated to a temperature within the range of 150°–175° F. In addition, the yield strength and two-week heat flow of Compositions 4–6 was superior to that of Composition 1, and it can be seen that yield strength increased and that heat flow generally decreased as the room temperature stiffness of the compound increased over the range of 125 to 250 p.c.i.

EXAMPLE II.

Composition 2 of Example I was heated to 275° F. and extruded at that temperature as a tape onto a sub-

TABLE 1

|  | 1 | 2 | 3 | 4 | 5 | 6 |
|---|---|---|---|---|---|---|
| Compression value, p.c.i. @ 75° F | 106 | 324 | 125 | 149 | 187 | 250 |
| Share hardness, "A" (ASTM D-2240) | 16 | 45 | 18 | 28 | 25 | 38 |
| Yield, p.s.i | *11C | **39.4A | 13C | 16.4C | 17.9C | 27.8C |
| Heat flow, .001'': |  |  |  |  |  |  |
| 1 hr. @ 75° F | 216 | 213 | 214 | 215 | 220 | 216 |
| 24 hr. @ 190° F | 217 | 216 | 209 | 212 | 218 | 215 |
| 2 weeks @ 190° F | 207 | 214 | 203 | 209 | 216 | 213 |
| Compression value, p.c.i., heated: |  |  |  |  |  |  |
| 105° F | 92 | 298 | 82 | 115 | 133 | 162 |
| 125° F | 75 | 242 |  |  |  |  |
| 150° F | 68 | 200 | 73 | 81 | 82 | 102 |
| 175° F | 56 | 170 | 44 | 63 | 66 | 79 |

* C = cohesive failure.
** A = adhesive failure.

In Composition 2, the amount of process oil and polybutene process aid was greatly reduced in order to increase the stiffness of the sealant. As a matter of fact, the Compression Value of this composition at 75° F. was 324 p.s.i., which is much too great to permit practical installation and sealing of a joint at room temperature by means of a sealant tape. It should be noted, however, that by heating the sealant to 175° F. the Compression Value was reduced to an acceptable value of 170 p.c.i. (It will be appreciated that the Compression Value could have been reduced even further without degradation of the sealant by heating to a somewhat higher temperature, e.g. 200°–250° F.). Most surprisingly, the yield strength of Composition 2 was almost four times higher than Composition 1, and the heat flow resistance of the stiffer compound was strate at room temperature (75° F.). A thermocouple probe was inserted into the tape immediately after extrusion to determine the rate of cooling, temperature being noted every minute. Compression assemblies were prepared in order to determine the Compression Values of the tape at equivalent temperatures. Results are reported in Table 2. By reference to Table 1 it can be seen that Composition 6 was characterized by a Compression Value of 250 p.c.i. at 75° F. and by excellent yield strength and heat flow resistance.

TABLE 2

| Time, Min. | Temperature, °F. | Compression Value, p.c.i. |
|---|---|---|
| 0 | 275 | — |
| 1 | 250 | — |

| | | |
|---|---|---|
| 2 | 215 | — |
| 3 | 187 | 80 |
| 4 | 162 | 95 |
| 5 | 143 | 108 |
| 6 | 130 | 120 |
| 7 | 123 | 125 |

This experiment reflects the cooling rate of the tape at ambient conditions and more specifically demonstrates that from the time of extruding the tape at 275° F. into a substrate at 75° F., 4–5 minutes were available for effecting a seal before the tape stiffened to a point where the Compression Value thereof was in excess of a most preferred value, i.e. 100–105 p.c.i.

EXAMPLE III.

Sealant Composition 6 of Example I was used to seal a windshield with the body of an automobile. The body was equipped with a channel member for receiving the tape and which served as a socket into which the windshield was inserted. Using an extruder which conformed to the description given in the parent application of this application, the sealant composition was extruded into the body channel as a tape at a temperature of 275° F. One to two minutes were required to apply the tape to the channel. Immediately thereafter, the windshield of the car was pressed into the body channel against the heated tape, and the tape was then chased with a caulking tool to provide neatness and security of fit. The sealed unit was then allowed to cool to room temperature.

EXAMPLE IV.

Sealant Composition 6 of Example I was used to seal expansion joints in a concrete roadway using the extruder of Example II except that the pressure generated by the extruder was used to force the sealant tape into already-existing joints between concrete strips of the roadway.

It has therefore been demonstrated that sealant tapes, which heretofore have been applied while the tape is at room temperature, can be produced and applied while hot in order to greatly facilitate the application, yield strength, and creep resistance of the sealant. It has also been demonstrated that the present methods provide superior results by use of tapes which are otherwise too stiff to install.

The present invention has been described with reference to particular materials, proportions, conditions, apparatus, techniques and the like, but it will be understood that still other embodiments will become apparent which are within the spirit and scope of the invention defined in the following claims.

Therefore, what is claimed is:

1. A process for sealing a structural joint with an elastomeric sealant composition in the form of a tape which comprises producing a tape from an elastomeric sealant composition that is undesirably stiff for application to and bonding with the substrate of the joint at ambient temperatures, the stiffness of the elastomeric sealant composition at 75° F. being characterized by a Compression Value within the range of about 150 p.c.i. to about 500 p.c.i., said produced tape being heated and thus softened to a Compression Value within the range of about 40 p.c.i. to about 175 p.c.i. when measured at the temperature to which the tape is heated, applying the heated tape to the structural joint to be sealed and sealing said joint with the tape while it is thus heated, and allowing the tape to cool after the sealing of the structural joint therewith.

2. The process of claim 1 wherein the Compression Value of the applied, heated tape is within the range of about 80 p.c.i. to about 120 p.c.i.

3. The process of claim 1 wherein the Compression Value of the tape at 75° F. is in excess of 200 p.c.i.

4. The process of claim 1 wherein the tape is applied to a joint between an automobile body and a window glass of an automobile.

5. The method of claim 4 wherein the Compression Value of said sealant composition at 75° F. is in excess of 200 p.c.i.

6. The method of claim 4 wherein the tape is continuously extruded and is simultaneously applied to a joint to be sealed.

7. The method of claim 4 wherein:
a. the elastomeric composition is extruded as a heated tape having a shape adapted to seal a joint existing between first and second structural members when edges of said members are placed adjacent to each other,
b. applying the resulting heated tape on an edge of said first member,
c. placing an edge of said second member in firm contact with the heated tape applied to the edge of said first member, thus establishing a sealing relationship between adjacent edges of the two members through contact with said tape, and
d. allowing said tape to cool after hot application to adjacent edges of both members.

8. The method of claim 7 wherein the tape is continuously extruded and is simultaneously applied to an edge of said first structural member.

9. A process for sealing a structural joint with an elastomeric sealant composition which comprises:
a. mixing a rubber, a filler and a plasticizer and forming a compounded elastomeric sealant composition thereof, the composition being undesirably stiff for application to and bonding with substrates of the joint at ambient temperatures, the stiffness of the composition at 75° F. being characterized by a Compression Value within the range of about 150 p.c.i. to about 500 p.c.i.,
b. extruding the composition in the form of a heated tape having a desired stiffness which is lower than measured at 75° F.,
c. applying the heated, extruded tape to the structural joint to be sealed, the stiffness of the applied heated tape being characterized by a Compression Value within the range of about 40 p.c.i. to about 175 p.c.i.,
d. sealing the structural joint with the applied tape while thus heated, and
e. allowing the tape to cool after sealing of the structural joint therewith.

10. The process of claim 9 wherein the Compression Value of the applied, heated tape is within the range of about 80 p.c.i. to about 120 p.c.i.

11. The process as in claim 10 wherein the sealant compound further comprises about 10 to about 60 parts by weight of a tackifying agent.

12. The method of claim 10 wherein the butyl rubber in said composition is partially vulcanized when extruded and applied to said joint.

13. The process as in claim 10 wherein the sealant composition comprises 100 parts by weight of butyl rubber, about 70 to about 150 parts by weight of carbon black, and about 50 to about 130 parts by weight of plasticizer oil.

14. The process of claim 9 wherein the sealant compound comprises 100 parts by weight of butyl rubber, about 50 to about 250 parts by weight of plasticizer oil, and about 70 to about 500 parts by weight of a filler.

* * * * *